(12) United States Patent
Meijer

(10) Patent No.: US 6,478,523 B1
(45) Date of Patent: Nov. 12, 2002

(54) BALE COLLECTOR WITH SWIVELLING REAR ROLLER BED PART

(75) Inventor: Thomas Harke D. Meijer, Ten Post (NL)

(73) Assignee: Meijer Ten Post Beheer B.V. (NL)

( * ) Notice: Subject to any disclaimer, the term of this patent is extended or adjusted under 35 U.S.C. 154(b) by 59 days.

(21) Appl. No.: 09/644,458

(22) Filed: Aug. 23, 2000

Related U.S. Application Data

(63) Continuation of application No. PCT/NL99/00065, filed on Feb. 9, 1999.

(30) Foreign Application Priority Data

Feb. 24, 1998 (NL) .............................................. 1008400

(51) Int. Cl.[7] .......................... B65G 27/06; B65G 13/00
(52) U.S. Cl. .................... 414/111; 414/24.5; 414/24.6; 56/432
(58) Field of Search ........................ 414/111, 25, 24.5, 414/24.6, 132, 529, 534; 56/430, 432

(56) References Cited

U.S. PATENT DOCUMENTS

| | | | |
|---|---|---|---|
| 3,974,632 A | | 8/1976 | Van der Lely |
| RE31,209 E | * | 4/1983 | Anderson .................. 172/311 |
| 5,086,847 A | * | 2/1992 | Meiners ..................... 172/240 |
| 5,456,075 A | * | 10/1995 | Meijer ........................ 100/189 |
| 5,540,144 A | * | 7/1996 | Schrag et al. ........... 100/188 R |
| 5,913,801 A | * | 6/1999 | Bottinger et al. ........ 56/10.2 R |
| 6,070,400 A | * | 6/2000 | Peeters et al. ................ 53/588 |
| 6,134,870 A | * | 10/2000 | Lippens et al. ................. 100/8 |

FOREIGN PATENT DOCUMENTS

DE    295 17 425 U1    1/1996

* cited by examiner

Primary Examiner—Eileen D. Lillis
Assistant Examiner—Charles Fox
(74) Attorney, Agent, or Firm—Todd Deveau; Ryan A. Schneider; Troutman Sanders LLP

(57) ABSTRACT

Bale collector comprising a roller bed with a number of horizontal rollers, which are positioned at right angles to a direction of travel and which are suitable for receiving thereon successive bales from a press outlet of a baling press and for having bales pushed backwards onto each other, whereby the roller bed comprises, viewed in the direction of travel, a front part and a rear part, which can swivel about a horizontal axis under control of control means which are coupled to the roller bed parts for moving a rear end of the rear roller bed part between an upper position at a height which allows conveyance of the rear end of the rear part of a bale over the rear part and from the rear part onto the ground, and a lower position of the rear end of the rear part at a height in which the rear part is inclined downwards with respect to the front part for allowing expedited conveyance of the bale from the rear part onto the ground.

20 Claims, 4 Drawing Sheets

BALE COLLECTOR WITH SWIVELLING REAR ROLLER BED PART

CROSS-REFERENCE TO RELATED APPLICATIONS

This is a continuation application of PCT/NL99/00065 filed Feb. 9, 1999.

FIELD OF THE INVENTION

The invention relates to a bale collector comprising a roller bed with a number of horizontal rollers, which are positioned at right angles to a direction of travel and which are suitable for receiving thereon successive bales from a press outlet of a baling press and for having bales pushed backwards onto each other, whereby the roller bed comprises, viewed in the direction of travel, a front part and a rear part, which can swivel about a horizontal axis under control of control means which are coupled to the roller bed parts for moving a rear end of the rear roller bed part between an upper position which is higher than the front part and a lower position which is lower than the front part for allowing conveyance of a bale from the rear part onto the ground.

BACKGROUND OF THE INVENTION

A bale collector of the above type is disclosed by DE-U-29517425. In an operating state, with the roller bed parts unfolded from each other and from the baling press, the prior art bale collector is suspended by chains and cables to the rear end of the baling press. In this state the roller bed is substantially straight and it has a length which is much smaller than the length of a bale. The prior an bale collector both provides a guidance means for bales when depositing them onto the ground, and allows safe transportation of the baling press and the bale collector mounted on the collector in a folded state.

With the prior at bale collector the bales supplied by the baling press are deposited onto the ground with fixed distances on which a user of the press and the collector has no influence. Thus, the bales may become distributed over the whole field on which the bales are made. This may be a disadvantage for time effective picking up and loading the bales from the field for transportation to a storage location.

It is observed that the length of the roller bed of the prior art bale collector is limited to prevent tilting rearward the combination of the baling press and the bale collector dependent on the weight of the bales. In this regard it is observed also that presently straw bales can have dimensions of 2.4 m long, 1.2 m wide and 0.7 m high with a weight of approximately 300 kg, while also presently silage bales of the same dimensions may have a weight of 500 to 800 kg.

SUMMARY OF THE INVENTION

The object of the invention is to eliminate the disadvantages of the known bale collector.

In order to achieve the above mentioned objective, the invention provides a bale collector comprising a roller bed with a number of horizontal rollers, which are positioned at right angles to a direction of travel and which are suitable for receiving thereon successive bales from a press outlet of a baling press and for having bales pushed backwards onto each other, whereby the roller bed comprises, viewed in the direction of travel, a front part and a rear part, which can swivel about a horizontal axis under control of control means which are coupled to the roller bed parts for moving a rear end of the rear roller bed part between an upper position which is higher than the front part and a lower position which is lower than the front part for allowing conveyance of a bale from the rear part onto the ground, and the lower position of the rear end of the rear part is of a height in which the rear part is inclined downwards with respect to the front part.

The bale collector according to the invention provides a buffer function which offers the user of the collector the possibility of depositing the bales in locations of his choice on the land.

BRIEF DESCRIPTION OF THE DRAWINGS

Other features and advantages will become clear from the description which follows in conjunction with the appended drawings, in which.

DESCRIPTION OF THE PREFERRED EMBODIMENT

Figure 1:
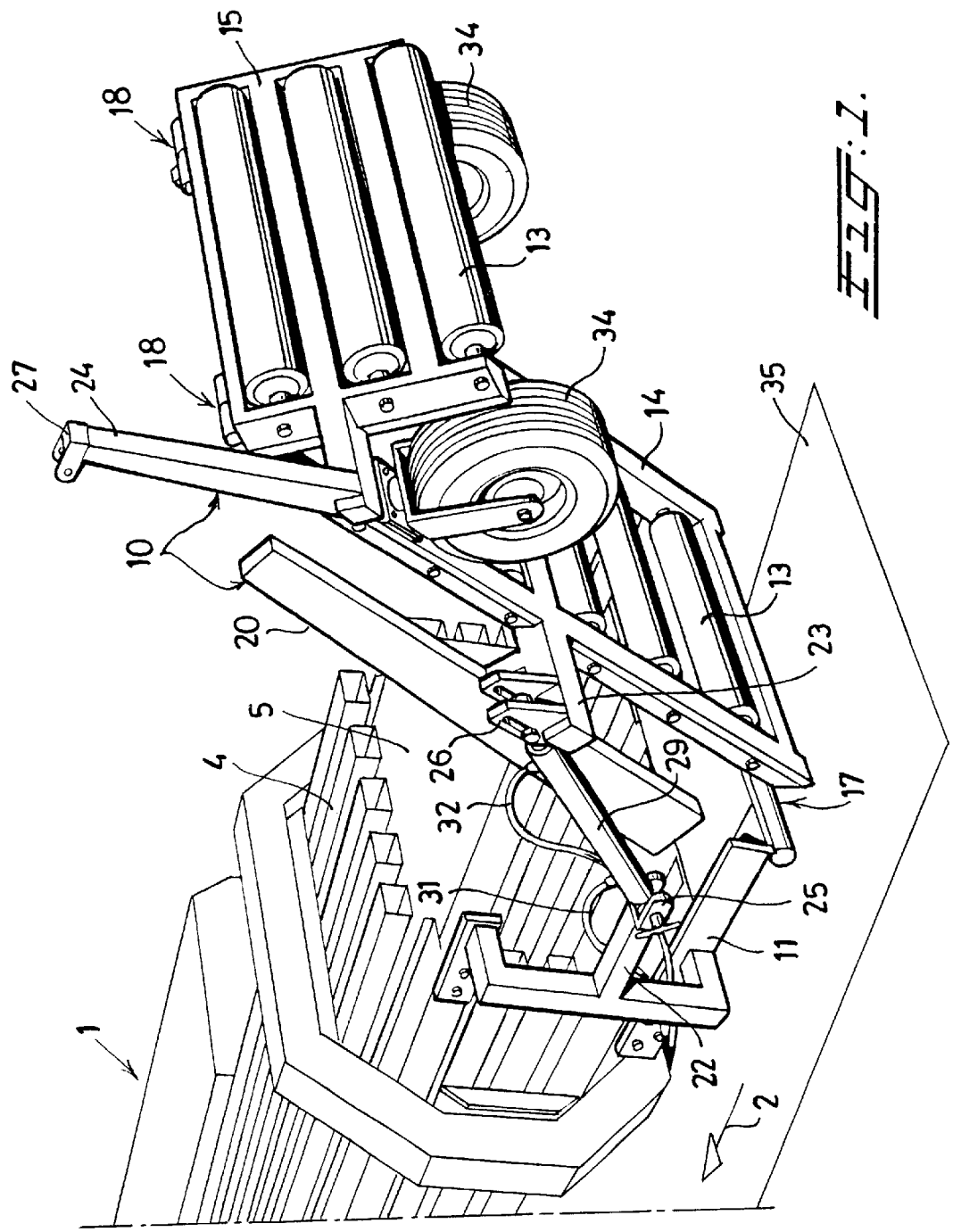
FIG. 1 shows in perspective an embodiment of a bale collector according to the invention in a retracted, unused state.

FIG. 1 shows a rear part of a baling press 1, which travels in the direction indicated by the arrow 2 during normal operation. The baling press 1 has a press channel 4, which at a rear end thereof opens out into a press outlet 5.

A bale collector 10 according to the invention comprises a coupling piece 11, by means of which the collector 10, as shown, can be coupled to the rear end of the press channel 4.

The bale collector 10 further comprises a roller bed, consisting of parallel, horizontal rollers 13, which are suitable for receiving thereon and conveying successive bales from the press outlet 5 of the baling press 1.

The roller bed is divided into a front part 14 and a rear part 15. The front part 14 is coupled to the coupling piece 11 in such a way that it swivels about a horizontal axis at 17. The front roller bed part 14 and the rear roller bed part 15 are coupled to each other in such a way that they swivel about a horizontal axis at 18. Said axes are parallel to the rollers 13.

The front roller bed part 14 has on either side an elongated guide element 20 for guiding bales moving over the rollers 13 parallel to the direction of travel 2.

The coupling piece 11, the front roller bed part 14 and the rear roller bed part 15 each have a respective connecting arm 22, 23, 24 with respective coupling ends 25, 26 and 27. A cylinder, in particular a hydraulic cylinder 29, can be fitted between the coupling ends 25 and 26 or between the coupling ends 26 and 27. The cylinder 29 can be controlled from the baling press 1 by way of hoses 31, 32, in particular by a driver of the baling press 1. In particular, a single cylinder, the cylinder 29, is used.

In the state of the bale collector 10 shown in FIG. 1 the cylinder 29 is fitted between the coupling ends 25, 26 of the coupling piece 11 and the front roller bed part 14 respectively, and the cylinder 29 is retracted, with the result that the front roller bed part 14 is drawn upwards, so that wheels 34 attached thereto are clear of the ground 35, and the rear roller bed part 15 hangs down by its own weight. In this state the bale collector 10 can be transported safely and easily while it is coupled to the baling press 1.

Figure 2:
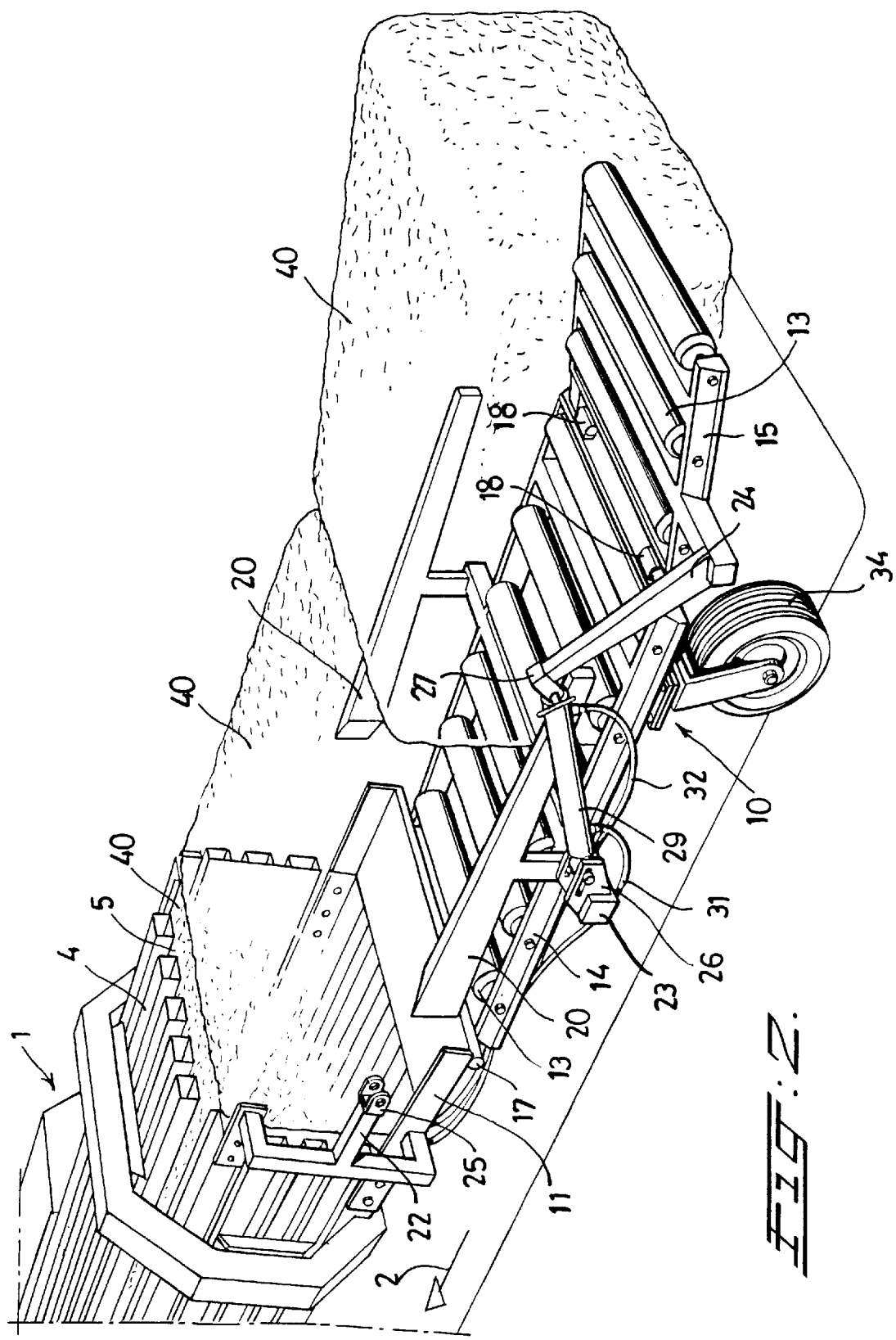
FIG. 2 shows in perspective the bale collector of FIG. 1 in a collecting and buffer state.
Figure 3:
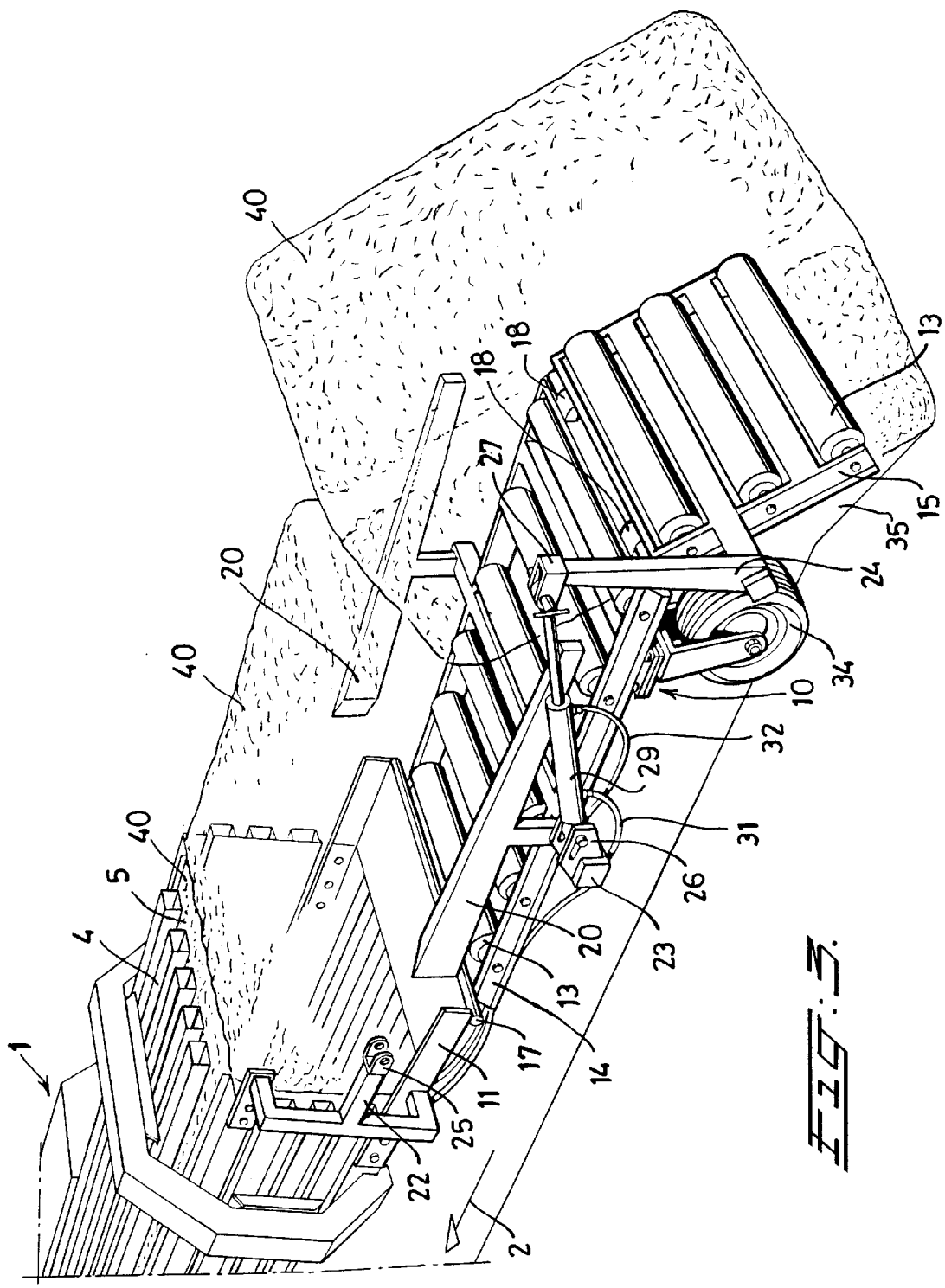
FIG. 3 shows in perspective the bale collector of FIG. 1 in a collecting and depositing state.

In the case of the states of the baling press 10 shown in FIGS. 2 and 3 the cylinder 29 is fitted between the coupling ends 26 and 27 of the front roller bed part 14 and the rear roller bed part 15 respectively. In both situations of FIGS. 2 and 3 the wheels 34 are resting on the ground 35. In the situation of FIG. 2 the cylinder 29 is retracted, and in the situation of FIG. 3 the cylinder 29 is extended.

A rear bale 40 supported by the roller bed will tilt over a highest rear end of the roller bed part 14, 15 and be deposited on the ground 35 when the centre of gravity of the bale has been pushed backwards beyond said highest rear end. The time which then elapses before a following rear bale 40 is deposited on the ground 35 can be called buffer time.

The buffer time depends on various factors, in particular: the lengths of the roller bed parts 14, 15 relative to the lengths of the bales 40, the highest position of the rear ends of the roller bed parts 14, 15, the heights of the bales 40, the supply speed of the bales 40 from the baling press 1, and the moment at which a user controls the cylinder 29 in order to swivel the rear roller bed part 15 downwards (FIG. 3).

The user can use the buffer time to deposit successive rear bales 40 in respective desired locations on the land 35. For that purpose, the user can set a suitable fixed angular position of the rear roller bed part 15 by means of the cylinder 29 and/or at suitable moments the user can swivel the rear roller bed part 15 downwards by means of the cylinder 29 to such an extent that a rear bale is deposited directly on the ground, after which the user swivels the rear roller bed part 15 up again to the initial, higher position.

A bale collector according to the invention can be designed with or without the swivelling coupling between the front coupling piece 11 and the front roller bed part 14.

Figure 4:
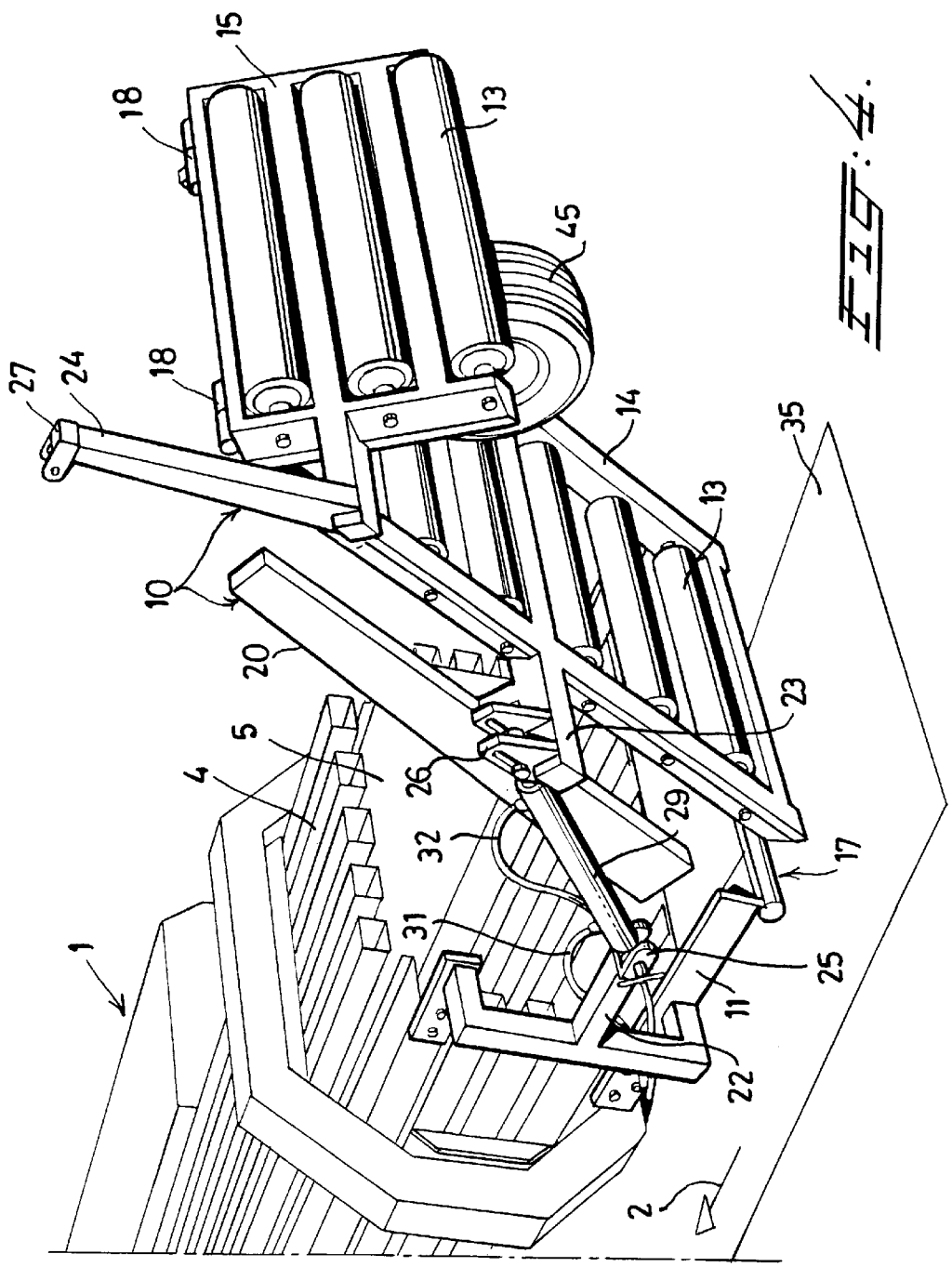
FIG. 4 shows in perspective another embodiment of a bale collector according to the invention in a retracted, unused state.

In a preferred embodiment of a bale collector 44 according to the invention, shown in FIG. 4, such a swivelling coupling is present and one or more wheels 45 are fitted substantially only in the centre on the underside of the front roller bed part 14, viewed at right angles to the direction of travel 2. This means that when the baling press is being used on hilly terrain one or more wheels are prevented from leaving the ground, and the swivelling coupling is prevented from sustaining damage (through torsion).

Furthermore, one or more of the rollers 13 shown in the figures can be replaced by a sliding plate or other suitable guide means.

What is claimed is:

1. Bale collector comprising a roller bed with horizontal rollers, the horizontal rollers positioned at right angles to a direction of travel and suitable both for receiving thereon successive bales from a press outlet of a baling press and for having bales pushed backwards against each other, whereby the roller bed comprises, a front roller bed part separate from a rear roller bed part, which parts can swivel about a horizontal axis under control of control means which is coupled to the front and rear roller bed parts, wherein there is defined an angle between an upper side of the front roller bed part and an upper side of the rear roller bed part, wherein in an upper position of the rear roller bed part the angle is less than 180 degrees, and wherein in a lower position of the rear roller bed part the angle is greater than 180 degrees, the lower position for allowing conveyance of a bale from the rear roller bed part onto the ground.

2. Bale collector according to claim 1, the control means of which comprising a control cylinder of which a first end is coupled to the front roller bed part and of which a second end is coupled to the rear roller bed part, wherein the second end of the cylinder can be coupled exchangeably to the rear roller bed part or to the baling press, in order to permit swiveling of the rear roller bed part relative to the front roller bed part or to permit swiveling of the roller bed relative to the baling press, respectively.

3. Bale collector according to claim 1, whereby a front end of the front roller bed part can be coupled to the baling press to allow it to swivel about a horizontal axis, wherein a supporting wheel is fitted substantially in the centre on the underside of the front roller bed part, viewed at right angles to the direction of travel.

4. Bale collector according to claim 1, wherein with the rear roller bed parts in the upper position, a bale can be pushed backwards over the front and rear roller bed parts, and tipped over a rear end of the rear roller bed part.

5. A bale collector comprising:

a front roller bed having a front end and a rear end;

a rear roller bed having a front end and a rear end;

a first coupling for swivelingly connecting at a first horizontal axis the rear end of the front roller bed to the front end of the rear roller bed;

an angle being defined between an upper side of the front roller bed and an upper side of the back roller bed;

a control means for moving the rear end of the rear roller bed between an upper position and a lower position, wherein in the upper position the angle is less than 180 degrees, and wherein in the lower position the angle is greater than 180 degrees; and rollers, at least one roller in each of the front roller bed and the rear roller bed.

6. The bale collector of claim 5, wherein with the rear end of the rear roller bed in the upper position, a bale can be pushed over the front and rear roller beds, and tipped over the rear end of the rear roller bed.

7. The bale collector of claim 6 further comprising a second coupling for coupling the bale collector to a baling press.

8. The bale collector of claim 7, wherein the front roller bed is coupled to the second coupling in such a way that the front roller bed can swivel about a second horizontal axis, and wherein the first and second horizontal axes are parallel to the rollers.

9. The bale collector of claim 6, wherein the control means comprises a control cylinder having a first end coupled to the front roller bed and a second end coupled to the rear roller bed, to permit swiveling of the rear roller bed relative to the front roller bed.

10. The bale collector of claim 6, wherein the rollers are parallel to one another and are suitable for receiving and conveying successive bales from the baling press.

11. The bale collector of claim 10, wherein rollers are positioned at right angles to a direction of travel of the bale collector.

12. The bale collector of claim 6, wherein the control means comprises a control cylinder having a first end coupled to the front roller bed and a second end coupled to the baling press, to permit swiveling of the rear roller bed relative to the baling press.

13. The bale collector of claim 6, further comprising guide elements for guiding bales over the rollers parallel to a direction of travel of the bale collector.

14. A bale collector comprising:
a front roller bed having a front end and a rear end;
a rear roller bed having a front end and a rear end;
a first coupling for swivelingly connecting at a first horizontal axis the rear end of the front roller bed to the front end of the rear roller bed;
an angle being defined between an upper side of the front roller bed and an upper side of the back roller bed;
a control means for moving the rear end of the rear roller bed between an upper position and a lower position, wherein in the upper position the angle is less than 180 degrees, and wherein in the lower position the angle is greater than 180 degrees;
rollers, at least one roller in each of the front roller bed and the rear roller bed; and
a baling press;
wherein the front end of the front roller bed is coupled to the baling press at a second coupling to allow it to swivel about a horizontal axis,
wherein with the rear end of the rear roller bed in the upper position, a bale can be pushed over the front and rear roller beds, and tipped over the rear end of the rear roller bed; and
wherein a supporting wheel is fitted substantially in the centre on the underside of the front roller bed, viewed at right angles to a direction of travel of the bale collector.

15. The bale collector of claim 14, further comprising guide elements for guiding bales over the rollers parallel to a direction of travel of the bale collector.

16. The bale collector of claim 14, wherein the control means comprises a control cylinder having a first end coupled to the front roller bed and a second end coupled to the rear roller bed, to permit swiveling of the rear roller bed relative to the front roller bed.

17. The bale collector of claim 14, wherein the rollers are parallel to one another and are suitable for receiving and conveying successive bales from the baling press.

18. The bale collector of claim 14, wherein the control means comprises a control cylinder having a first end coupled to the front roller bed and a second end coupled to the baling press, to permit swiveling of the rear roller bed relative to the baling press.

19. The bale collector of claim 14, wherein the front roller bed is coupled to the second coupling in such a way that the front roller bed can swivel about a second horizontal axis, and wherein the first and second horizontal axes are parallel to the rollers.

20. The bale collector of claim 14, wherein rollers are positioned at right angles to a direction of travel of the bale collector.

* * * * *